US006996844B2

(12) United States Patent  (10) Patent No.: US 6,996,844 B2
Langford et al.  (45) Date of Patent: Feb. 7, 2006

(54) SWITCH-USER SECURITY FOR UNIX COMPUTER SYSTEMS

(75) Inventors: John Steven Langford, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/773,187

(22) Filed: Jan. 31, 2001

(65) Prior Publication Data

US 2002/0144135 A1  Oct. 3, 2002

(51) Int. Cl.
*G06F 11/30* (2006.01)
*G06F 12/14* (2006.01)
*H04L 9/00* (2006.01)
*H04L 9/32* (2006.01)

(52) U.S. Cl. .............................. 726/23; 726/22; 713/1; 713/66; 713/100; 713/164; 709/223; 709/224; 709/225; 707/9

(58) Field of Classification Search ................ 713/200, 713/201, 202, 100, 164, 166, 1, 66; 709/223–225, 709/229; 707/9; 726/22, 23
See application file for complete search history.

(56) References Cited

U.S. PATENT DOCUMENTS

| 5,280,581 | A | | 1/1994 | Bathrick et al. ............. 395/200 |
| 5,604,490 | A | | 2/1997 | Blakley, III et al. .... 340/825.31 |
| 5,958,007 | A | | 9/1999 | Lee et al. ................... 709/219 |
| 6,647,400 | B1 | * | 11/2003 | Moran ......................... 707/205 |
| 2002/0046275 | A1 | * | 4/2002 | Crosbie et al. ............. 709/224 |
| 2002/0083343 | A1 | * | 6/2002 | Crosbie et al. ............. 713/201 |

OTHER PUBLICATIONS

Craig H. Rowland, Logcheck, Jun. 14, 2000, http://ftp.cerias.purdue.edu/pub/tools/unix/logutils/logcheck/README.local.*
Trevor Warren, Intrusion Detection Systems, Part IV: Logcheck, http://www.freeos.com/articles/3540.*

* cited by examiner

*Primary Examiner*—Kim Vu
*Assistant Examiner*—Beemnet Dada
(74) *Attorney, Agent, or Firm*—Robert H. Frantz; David A. Mims, Jr.

(57) ABSTRACT

A monitoring process for defining and detecting user-switch violations and issues in a UNIX-based computer system periodically alerts system administrators of potential security risks. The monitoring process is executed at predetermined schedules, or invoked by manual command. A set of rules is defined by the system administrator, and any user-switch instances found in the UNIX user-switch log which match any rule are flagged as violations or potential security issues, and an alert notification is issued to a specified output device, such as an email address.

19 Claims, 2 Drawing Sheets

*Prior Art*

SWITCH-USER SECURITY FOR UNIX COMPUTER SYSTEMS

BACKGROUND OF THE INVENTION

1. Field of the Invention

This invention relates to the arts of computer user security and access control technologies, especially to those employed in UNIX and UNIX-like operating systems.

2. Description of the Related Art

The UNIX operating system, in all its varied forms and including similar operating systems, is a powerful tool upon which to base mission-critical applications. Its security, scalability, and robustness have led it to withstand the tests of time, and today, the majority of web servers are hosted on UNIX computers. Despite all of its strengths, however, methods exist to take advantage of its capabilities. Eliminating, or at least mitigating, the possibility of malicious actions is a major goal for UNIX system administrators.

One aspect of the UNIX system which may be open to manipulation is that of a user switching IDs ("SU'ing") to a different user. In some cases, this may be done maliciously. In less than fifteen seconds at an unguarded root console, a malevolent user could enable SU functionality for his or her ID. Subsequently, that user could take on root authority on the machine, and either view or destroy sensitive data upon the system which is privileged to the root user, but not to the malevolent user's normal ID. Such "user switching" could also be done accidentally through a slip of the finger, or an authorized system administrator could inadvertently grant SU authority to a user.

Regardless of whether the switch is accomplished maliciously or accidentally, the effect is the same, in that the impacted user now has complete control and privileges over the entire system.

Two means exist for the administrator to uncover that such authority has been granted and/or used. The system administrator can manually review the characteristics of each individual user ID's. As large organizations often have hundreds or even thousands of users configured to use their systems, such periodic checks are not practical.

The second method which can be used is a visual inspection of the "SULOG" file, which contains a history of the "switch user" activities. Since this file can be extremely large, and is buried down within the system directory structure, inspection of the SULOG occurs seldom, if ever. Typically, an administrator is usually far too occupied with other responsibilities to check this file regularly.

It should be noted that SU authority can be granted in order to give a specific user the ability to switch to the root ID, or it can be granted to give users access to other ID's as well. Frequent examples of the latter include permitting certain users to switch their log-in to an "oracle" ID or a "backup" ID. Since such ID's often have expanded and critical functions and data available to them, it is also important to watch for such activity as this as well.

Therefore, a user who has been granted a low-level or restricted level of privileges or "permissions" may be his assigned initial login ID, but then he may obtain a higher level of privileges through doing a SU operation to the root ID. This is currently very difficult to track or detect given the default functions available in UNIX or other UNIX-like operating systems.

Therefore, there is a need in the art for a system and method to monitor unauthorized user switching or user substitutions on UNIX-based and UNIX-like systems so that appropriate corrective actions may be taken upon the detection of unauthorized user switching activities. This system preferably should be easily implement able by system administrators without significant changes to the operating system or user ID's that are already defined. Preferably, the system and method shall provide a remote notification function in order to notify a system administrator of a detected violation, such as an email notice.

BRIEF DESCRIPTION OF THE DRAWINGS

The following detailed description when taken in conjunction with the figures presented herein provide a complete disclosure of the invention.

SUMMARY OF THE INVENTION

A monitoring process is disclosed for defining and detecting user-switch violations and issues in a UNIX-based computer system periodically alerts system administrators of potential security risks. The monitoring process is preferably executed at predetermined schedules, or invoked by manual command. A set of rules is defined by the system administrator, and any user-switch instances found in the UNIX user-switch log which match any rule are flagged as violations or potential security issues, and an alert notification is issued to a specified output device such as an email address.

The violation rules are conveniently defined in a text file, and the UNIX scheduling daemon CRON is configured to periodically execute the monitoring script in the preferred embodiment. Thus, a system administrator may configure the rules, the periodicity of monitoring, the alert output destination, and even the source user-switch log file, thereby allowing maximum flexibility for the system administrator to find and detect a wide variety of possible security issues.

DETAILED DESCRIPTION OF THE INVENTION

The UNIX operating system and similar operating systems such as IBM's AIX, BSD, Hewlett Packard's HP-UX, LINUX, and SUN Microsystems' Solaris operating systems are all viable alternatives for implementation of the current invention. As these operating systems are well-known in the art, the invention disclosed herein will be described relative to UNIX in a general manner. It is well within the skill of those in the art to adapt the disclosed invention to a particular UNIX-like operating system.

Figure 1:
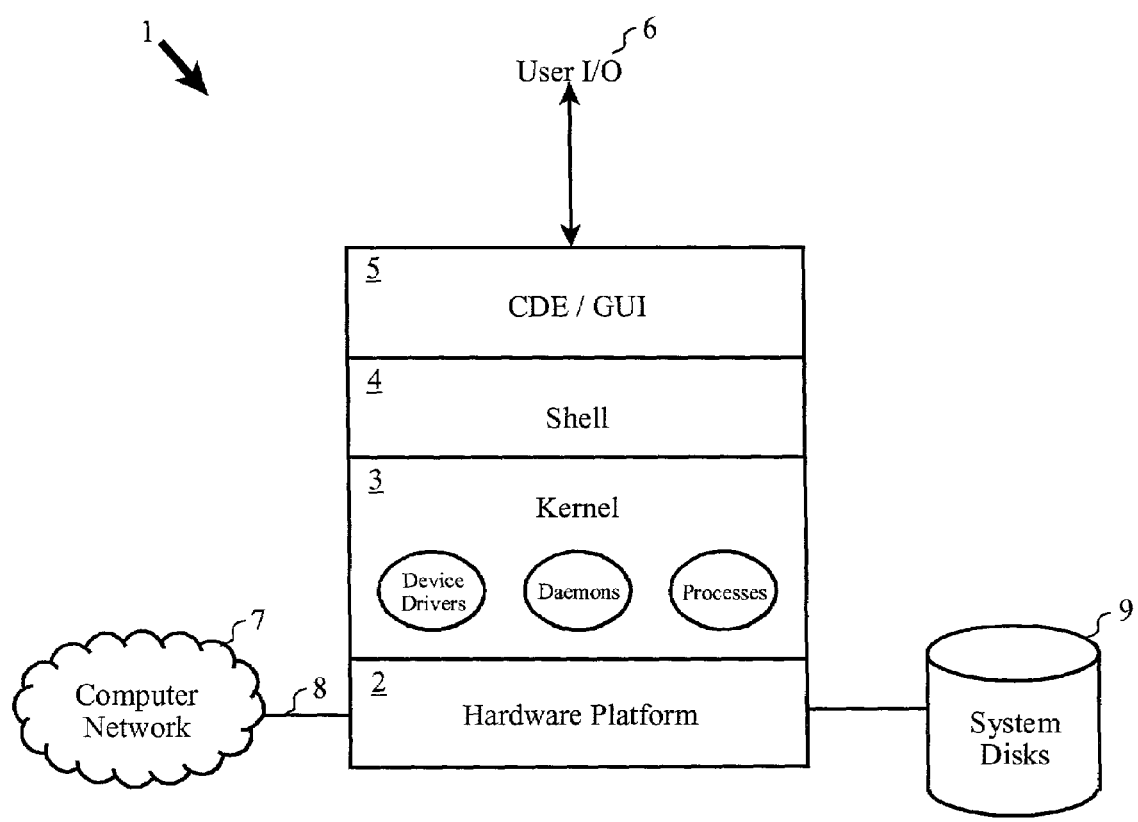
FIG. 1 sets forth the general architecture of UNIX-based computer systems.

Turning to FIG. 1, the generalized architecture (1) is shown of a UNIX-based computer system. The hardware platform (2) typically comprises a central processing unit or microprocessor, system memory and user interface devices such as keyboard, displays, pointing devices, and multimedia peripherals. The hardware platform may be a personal computer, or a multi-user server class computer. The UNIX kernel (3) provides system management functions which manage system memory for executing software processes and daemons. The kernel (3) also manages the system hardware devices, schedules the execution of all commands, and contains device drivers that control the system hardware. Device drivers are device-specific software modules and files which allow the software processes and system daemons to interface to the hardware platform components, such as disk drives, network interface cards, the display, and printers.

The UNIX shell (4) is the user interface command line component of the system which allows commands of a simple nature to be input to the system. Commands which are input through the shell (4) are passed to the kernel (3), software processes, or system daemons for processing and execution.

Some Unix-based systems are provided with a graphical user interface ("GUI") or common desktop environment ("CDE") (5) which provides a more user-friendly interface, such as a windowing environment.

Additionally, some UNIX systems, such as workstations, have direct user interface devices (6) such as keyboards, monitors, and pointing devices. However, some UNIX based systems are networked to a computer network (7) through various forms of well-know network interfaces, such as Ethernet cards and modems, which allow the UNIX-based system (1) to be shared among multiple users who are remotely located. Almost all the UNIX-based systems are provided with system disks, such as hard drives (9).

In the preferred embodiment, the invention is implemented on a UNIX-based system as shown in FIG. 1, and the logic of the invention is implemented as a script which is executed upon a predetermined schedule and/or upon specific invocation by the system administrator.

The script, which is described in more detail later, is executed on a predetermined schedule preferably by the system's "CRON" daemon. The CRON daemon is a common UNIX system daemon which reads configuration files, and acts on their contents. This is a convenient method of running the SUMON script on a periodic basis, but is not the only possible implementation for such periodic execution of the script. For example, the script could be self-timed, running in a loop until the system clock reached predetermined values, or it could be assigned to a system timer interrupt. As such, the use of the CRON daemon is an aspect of the preferred embodiment but is not a limitation of the present invention.

Typically, the CRON configuration files contain the command or commands to be executed, the day, date and time to run the commands, and the user name(s) under which the command(s) should be executed. These configuration files are called "CRONTAB" files in most UNIX-like systems.

The CRON daemon and CRONTAB files are well-known within the art. Thus, in the preferred embodiment, a script is provided on a UNIX-based system, which is then scheduled through the use of a CRONTAB file to be executed by the CRON daemon on a periodic basis. This frees the system administrator from the need to periodically or regularly monitor the SULOG file. However, should the system administrator desire to run the invention at any time, he may invoke it through a simple command line input.

The user switch (or user substitution) monitoring script, which is refered to as "SUMON", is configured by a CRONTAB file to be executed periodically, such as once per day, as shown in the example of TABLE 1.

TABLE 1

Example CRONTAB file contents

<time> sumon -f <sourcefile> -e <emailaddress> -r <rulesfilesname>

As shown in Table 1, <time> specifies the minutes, hours, day of the month, month, and day of the week to execute the SUMON script. For example, to schedule CRON to run the SUMON script once daily at 11:55 PM, the parameter <time> would be set to "55 23 ** * ", where the wildcard characters "*" indicate any day of the month, any month, and any day of the week.

Further as shown in Table 1, the "-f <sourcefile>" parameter specifies the file in which to search for SULOG information. If omitted, the system default SULOG file is searched, such as "/var/adm/syslog".

The parameter "-e <emailaddress>" specifies an e-mail address where alert messages are to be sent if an alarm condition is detected. If this parameter is omitted, the alerts may be sent to a default e-mail address, such as root@<host_name> where <host_name> is the name of the host computer on which the SUMON script is running.

The parameter "-r <rulesfilename>" specifies the file containing a list of user switching conditions which will trigger the alert notification.

For reference, Table 2 illustrates an example of an SULOG, which contains the history of the "substitute user" command usage on the system. SULOG, or it's equivalent, is created automatically by the system kernel each time a user invokes the SU command.

TABLE 2

Example SULOG file contents

SU 07/05 15:29 + pts/2 notes-root
SU 07/07 15:17 + pts/1 root-root
SU 07/07 15:17 + pts/1 root-notes
SU 06/31 09:25 − pts/1 notes-root
SU 09/08 08:56 + pts/1 root-root
SU 09/08 09:06 + pts/3 notes-root
SU 09/08 09:06 + pts/3 notes-root The example of an SULOG given in TABLE 2 is very brief compared to typical SULOG files found on real UNIX-based systems. Most SUTLOG files contain hundreds or even thousands of entries, in practice, for a single day's activities.

An alarm conditions file, or "RULES" file, contains definitions for times or time ranges in which to search the SUTLOG for violations, user switching conditions considered a violation, and how many violation instances may be tolerated before creating an alert. For example, a system administrator may want to receive alerts for the following user switching conditions:

1. if ANYONE switches to ROOT;
2. if ANYONE switches ANY OTHER SPECIFIED ID;
3. if a SPECIFIC USER switches to another ID between CERTAIN HOURS; or
4. if a SPECIFIC USER switches over an absolute number of occasions within a set window of time.

TABLE 3 shows example contents of a RULES file. If any of the specified rules, which are set by the system administrator, are detected as broken when the SUMON script is executed, then alerts are sent to the specified e-mail address (typically configured to point to the system administrator's e-mail address).

TABLE 3

Example Rules file contents

| from-id | to-id | time-start | time-stop | occurences |
|---------|--------|------------|-----------|------------|
| * | root | * | * | −1 |
| batch | oracle | 0600 | 1700 | −1 |
| joe | backup | * | * | 5 |

The first line of the example RULES file specifies that a switch from any ID to ROOT, at any time, is a violation, The "−1" signifies that any occurrence of this situation is not tolerable.

In the second line of the example rules file, another violation is defined as any time the BATCH ID is switched to ORACLE between 6:00 AM and 5:00 PM.

In the third line of the example rules file, yet another violation is defined as any time user "joe" switches to the BACKUP ID more than 5 times within the SULOG file. This type of rule may be useful for detecting switches which are normally allowable, but when made too often may indicate a security issue. The system administrator may control the length of the time in which 5 switches are allowed by clearing the SULOG periodically.

So, as previously described, a SUMON script is used to implement the logic which searches the SULOG for entries in the log file which violate the rules as established in the rules file. A UNIX script file or "shell script," contains a series of commands within a file which can then be executed by manual invocation or by automatic system invocation. Scripts are well-known within the art, and are commonly used to automate manual series of actions taken at the shell level. Scripts can contain commands to execute loops, IS-THEN statements, as well as other commands. Also, scripts can accept parameter input tasks into the script for processing from the command line or from the script file.

Figure 2:
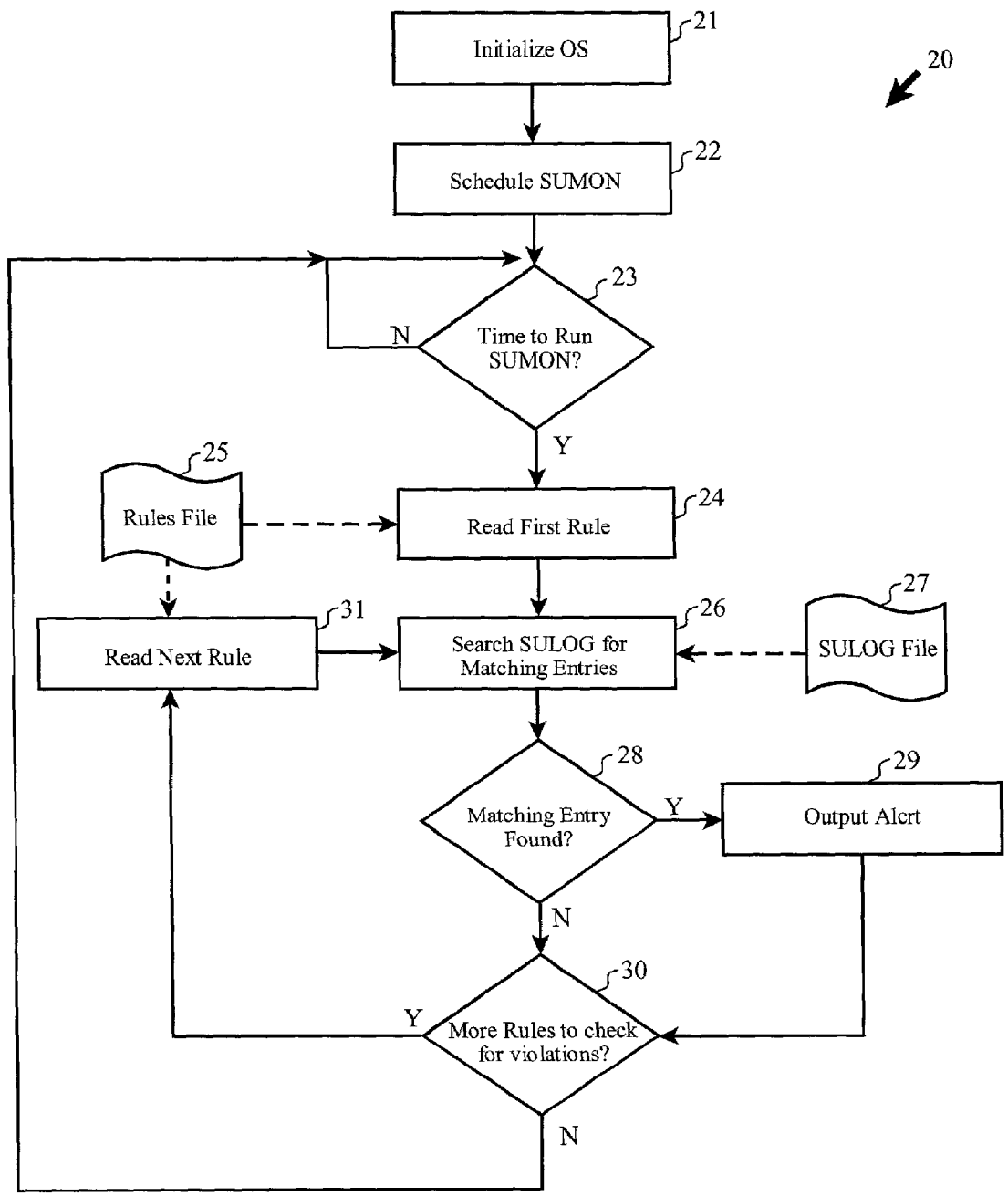
FIG. 2 illustrates the logical flow of the user-switch monitoring script or process.

Turning to FIG. 2, the fundamental logic of the SUMON script is disclosed. After the system has been initialized (21), the SUMON script is scheduled (22) to be executed by the CRON daemon by specifying an appropriate CRONTAB file, such as that shown in TABLE 1. Then, the UNIX CRON daemon continually monitors (23) the system clock to determine if it is time to run the SUMON script.

When it is time to execute the SUMON script (or when the script is manually invoked by the system administrator), the first rule is read (24) from the RULES file (25). Then, the SULOG (27) is searched (26) for any entries that match or violate the current rule. If an entry is found (28) that matches the current rule, an output alert is created (29), such as an email message to the specified email recipient or an entry into alert file.

Next, the RULES file (25) is checked (30) to determine if any additional rules are to be checked. If additional rules exists, then the next rule is read (31) and the SULOG is searched (26) again for matching entries.

Once all of the rules have been processed (30) the SUMON script terminates execution and is not run again until the CRON daemon detects that it is time to execute the SUMON script again (23), or until it is manually invoked by the system administrator.

Thus, by periodically and automatically reviewing the SULOG using the SUMON script as disclosed, security for the UNIX environment is increased, and the system administrator is relieved of the tedious job of looking through hundreds to thousands of SULOG entries find any one of many possible violation conditions. It will be recognized by those skilled in the art that many variations, changes and alternatives may be used in the implementation of the invention, such as implementation of the SUMON function as a C++ or Java program, use of another operating system, etc., without departing from the spirit and scope of the invention.

As the description given herein is intended for illustrative purposes, the scope the invention should be determined by the following claims.

What is claimed is:

1. A method for detecting possible security violations and issues in a computer system related to user ID substituting and switching, said computer system having a log of user ID substitutions and switches, said method comprising the steps of:

providing a set of rules in a computer-readable alarm conditions file, said rules defining conditions of user ID substitutions and switches which are to be considered possible security issues, at least one of which rules is a rule besides a rule defining a number of failed user switches in a specified time period beginning at a first failed attempt, wherein said number is greater than 1;

providing a process adapted to access said alarm conditions file, and to evaluate said log of user ID substitutions and switches according to said set of rules;

evaluating said log of user ID substitutions and switches to find any entries in said log which meet one or more defined conditions in said set of rules; and outputting an alert responsive to finding one or more log entries which meet said conditions.

2. The method as set forth in claim 1 wherein said step of providing a process adapted to evaluate said log comprises configuring a script to periodically execute by a CRON daemon in a system having a UNIX-like operating system.

3. The method as set forth in claim 1 wherein said step of providing a process adapted to evaluate said log comprises configuring a process to periodically execute by a CRON daemon in a system having a UNIX-like operating system.

4. The method as set forth in claim 1 wherein said step of evaluating said log of user ID substitutions and switches comprises evaluating a SULOG file in a system having a UNIX-like operating system.

5. The method as set forth in claim 1 wherein said rules comprise at least one rule including an electronic mail address to which alert messages should be sent, and wherein said step of outputting an alert comprises sending an electronic message to a predetermined electronic mail address as defined in a rule in said alarm conditions file.

6. A computer-readable medium having stored therein program code for detecting possible security violations and issues in a computer system related to user ID substituting and switching, said computer system having a log of user ID substitutions and switches, said program code when executed by a computer system causing the computer system to perform the steps of:

providing a set of rules in a computer-readable alarm conditions file, said rules defining conditions of user ID substitutions and switches which are to be considered possible security issues, at least one of which rules is a rule besides a rule defining a number of failed user switches in a specified time period beginning upon a first failed attempt, wherein said number is greater than 1;

accessing said alarm conditions file;

evaluating said log of user ID substitutions and switches to find any entries in said log which meet one or more defined conditions in said set of rules; and outputting an alert responsive to finding one or more log entries which meet said conditions.

7. The computer readable medium as set forth in claim 6 wherein said program code for performing the step of evaluating said log comprises program code for configuring a script to periodically execute by a CRON daemon in a system having a UNIX-like operating system.

8. The computer readable medium as set forth in claim 6 wherein said program code for performing the step of evaluating said log comprises program code for configuring a process to periodically execute by a CRON daemon in a system having a UNIX-like operating system.

9. The computer readable medium as set forth in claim 6 wherein said program code for performing the step of evaluating said log of user ID substitutions and switches comprises program code for evaluating a SULOG file in a system having a UNIX-like operating system.

10. The computer readable medium as set forth in claim 6 wherein said rules comprise at least one rule including an electronic mail address to which alert messages should be sent, and wherein said program code for performing the step of outputting an alert comprises program code for sending an electronic message to an electronic mail address as defined in a rule in said alarm conditions file.

11. A system for detecting possible security violations and issues in a multi-user computer related to user ID substituting and switching, said multi-user computer having a log of user ID substitutions and switches, said system comprising:

a hardware platform adapted to performing computing tasks with electronic circuitry, software, or both;

a set of rules in an readable an alarm conditions file readable by said hardware platform, said rules defining conditions of user ID substitutions and switches which are to be considered possible security issues, at least one of which rules is a rule besides a rule defining a number of failed user switches in a specified time period beginning from a first failed attempt, wherein said number is greater than 1;

a log evaluator for accessing said alarm conditions files in cooperation with said hardware platform, and for evaluation said log of user ID substitutions and switches to find any entries in said log which meet one or more defined conditions in said set of rules; and an alert output for outputting an alert responsive to finding one or more log entries which meet said conditions.

12. The system as set forth in claim 11 further comprising a scheduler for periodically operating said log evaluator.

13. The system set forth in claim 12 wherein said scheduler comprises a CRON daemon and said log evaluator comprises a script in a multi-user computer having a UNIX-like operating system.

14. The system as set forth in claim 12 wherein said scheduler comprises a CRON daemon and said evaluator comprises an executable UNIX process in a multi-user computer having a UNIX-like operating system.

15. The system as set forth in claim 11 wherein said evaluator is adapted to evaluate an SULOG file in a multi-user computer system having a UNIX-like operating system.

16. The system as set forth in claim 11 wherein said rules comprise at least one rule including an electronic mail address to which alert messages should be sent, and wherein said alert output comprises a transmitter for an electronic message to said electronic mail address.

17. The method as set forth in claim 1 wherein said alarm conditions file comprises a rule to generate an alert upon any user attempting to switch to a specific user ID defined by said rule.

18. The method as set forth in claim 17 wherein said specific user ID comprises a root ID.

19. The method as set forth in claim 1 wherein said alarm conditions file comprises a rule to generate an alert upon any user attempting to switch to another user ID between certain hours of system operation.

* * * * *